United States Patent
Antriasian

(10) Patent No.: US 10,101,007 B1
(45) Date of Patent: Oct. 16, 2018

(54) ADJUSTABLE AND DIRECTIONAL LIGHT ENHANCING ATTACHMENT FOR METAL LAMP REFLECTORS

(71) Applicant: Paul Merwin Antriasian, Palmdale, CA (US)

(72) Inventor: Paul Merwin Antriasian, Palmdale, CA (US)

( * ) Notice: Subject to any disclaimer, the term of this patent is extended or adjusted under 35 U.S.C. 154(b) by 0 days.

(21) Appl. No.: 15/130,833

(22) Filed: Apr. 15, 2016

Related U.S. Application Data

(60) Provisional application No. 62/148,888, filed on Apr. 17, 2015.

(51) Int. Cl.
  *F21V 17/02* (2006.01)
  *F21V 7/10* (2006.01)
  *F21V 7/00* (2006.01)

(52) U.S. Cl.
  CPC .............. *F21V 7/10* (2013.01); *F21V 7/0025* (2013.01)

(58) Field of Classification Search
  USPC ........................................................ 362/283
  See application file for complete search history.

(56) References Cited

U.S. PATENT DOCUMENTS

| | | | | |
|---|---|---|---|---|
| 5,521,803 A | * | 5/1996 | Eckert ................... | F16M 11/40 248/160 |
| 6,004,004 A | * | 12/1999 | Altman .................. | F21V 21/32 362/184 |
| 7,175,295 B2 | * | 2/2007 | Bretz ....................... | F21L 2/00 362/108 |
| 2015/0176780 A1 | * | 6/2015 | Sun .......................... | F21L 4/04 362/189 |

* cited by examiner

*Primary Examiner* — Rafferty Kelly
(74) *Attorney, Agent, or Firm* — Plager Schack LLP; Mark H. Plager; Alexis J. Saenz

(57) ABSTRACT

A light enhancing system is disclosed which extends the available area for capturing light from a source and adjustably increases the light concentration on a subject being lit. Embodiments may be beneficial to applications including grow lighting. One or more reflector panels may be detachably coupled to a lighting unit by a quick-connect fastener on the end of a flexible arm. Examples of quick-connect fasteners include threaded ends, press-fit ends, and magnetic ends. In some embodiments, the reflector panel may be retrofit onto a conventional lighting unit.

4 Claims, 6 Drawing Sheets

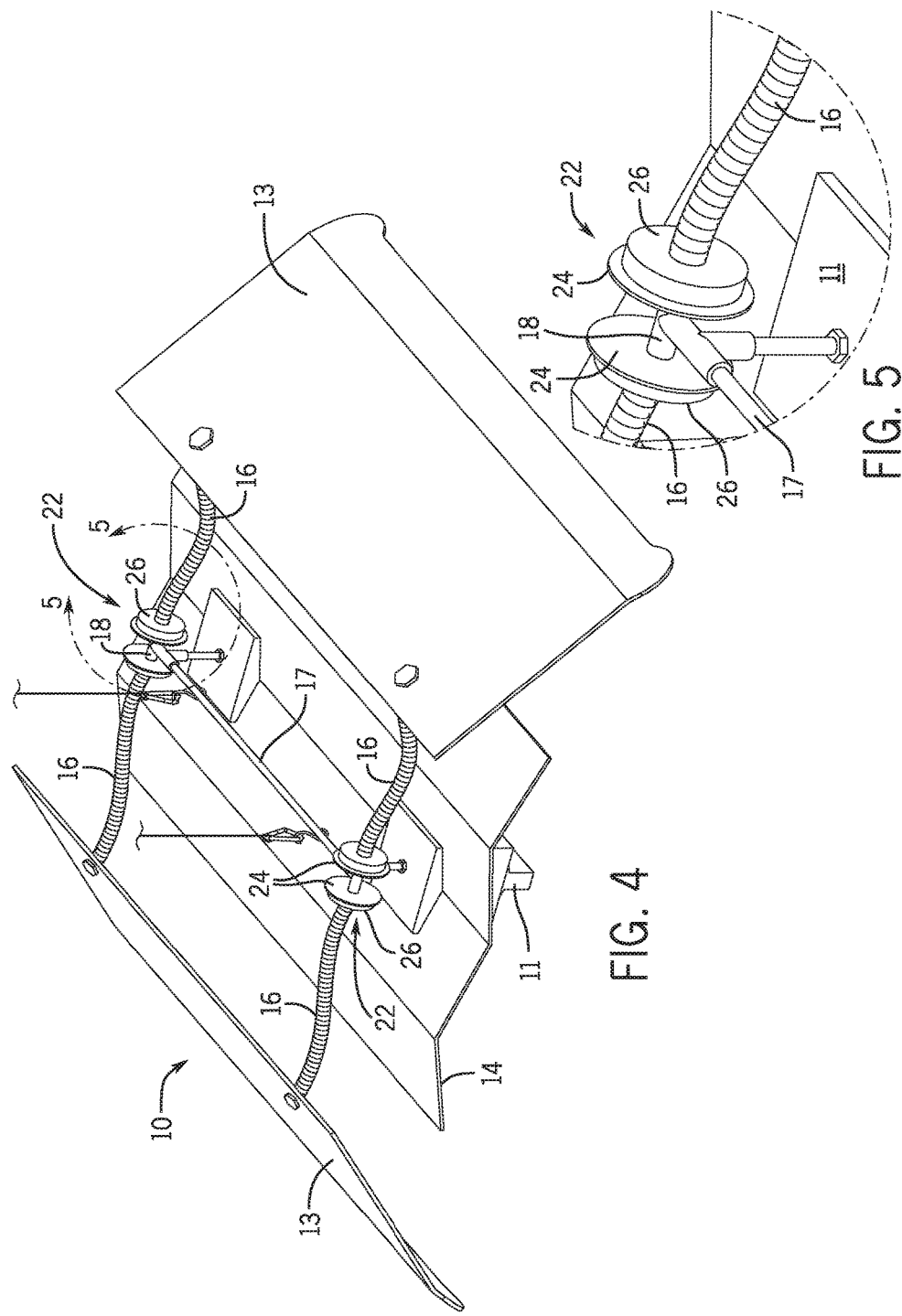

ADJUSTABLE AND DIRECTIONAL LIGHT ENHANCING ATTACHMENT FOR METAL LAMP REFLECTORS

CROSS-REFERENCE TO RELATED APPLICATIONS

This application claims benefit under 35 U.S.C. § 119(e) of U.S. Provisional Application having Ser. No. 62/148,888 filed Apr. 17, 2015, which is hereby incorporated by reference herein in its entirety.

BACKGROUND

The embodiments herein relate generally to lighting systems, and more particularly, to an adjustable and directional light enhancing attachment for metal lamp reflectors.

Conventional lighting systems provide inefficient light concentration onto subject areas. For example, fluorescent and incandescent systems typically provide a diffuse light output. While for most daily room lighting systems, light diffusion may be sufficient for a person's visibility, other application may need more light concentration. For example, indoor growing systems use artificial lighting to help stimulate photosynthesis. Under the proper wavelengths, plant growth can be substantial. However, with conventional lighting, light is emitted omnidirectional and thus, a significant portion of light energy is emitted away from a subject area. Some lighting systems, for example, an elongated fluorescent tube bulb and rectangular housing, include reflective internal surfaces of the housing to bounce more light back toward the subject area. Yet these systems still lose a lot of light to the periphery of the housing. The angles of the internal reflective surfaces are static and some surfaces do not point reflected energy to the subject area.

As can be seen, there is a need for a lighting system that improves the reflection of light toward a subject area.

SUMMARY

According to one embodiment, a light enhancing attachment for a metal lamp reflector, the metal lamp reflector including a light housing comprises a metal lamp reflector panel; a flexible arm including a first end affixed to the metal lamp reflector panel, the flexible arm configured to adjust an angle of reflection of light from the light housing off an underside of the metal lamp reflector panel; and a quick-connect fastener on a second end of the flexible arm, the quick-connect fastener attachable to a mount on the light housing.

According to another embodiment, a light enhancing system comprises a light housing including: a light source, a first reflector panel extending from the light housing, and a mount; a second reflector panel; a first flexible arm including a first end affixed to the second reflector panel; and a first quick-connect fastener on a second end of the first flexible arm, the first quick-connect fastener attachable and detachable to the mount of the light housing, wherein, when the first quick-connect fastener is attached to the mount, a distal edge of the second reflector panel is positioned beyond a distal end of the first reflector panel, and wherein the first flexible arm is configured to adjust an angle of reflection of light from the light source off an underside of the second reflector panel.

BRIEF DESCRIPTION OF THE FIGURES

The detailed description of some embodiments of the present invention is made below with reference to the accompanying figures, wherein like numerals represent corresponding parts of the figures.

FIG. 4 is a perspective top view of a light enhancing system in accordance with another exemplary embodiment of the subject technology;

FIG. 5 is an enlarged view of the circle 5 of FIG. 4;

DETAILED DESCRIPTION OF CERTAIN EMBODIMENTS

The word "exemplary" is used herein to mean "serving as an example or illustration." Any aspect or design described herein as "exemplary" is not necessarily to be construed as preferred or advantageous over other aspects or designs.

Generally, embodiments of the subject technology provide light enhancement for applications such as grow lighting. Exemplary embodiments improve the amount of light reflected onto a subject area. Aspects of the lighting system make better use of a light source by shortening the distance to the targeted area of, for example, a garden subjected to grow lighting. In addition, energy is saved and produces more light by capturing what would otherwise be stray lost light with no additional heat. In some embodiments, a detachable attachment system may retrofit onto grow light sources in the garden and greenhouse industry. As will be appreciated, features of the embodiments disclosed will increase the yield in any garden using grow light.

Figure 1:
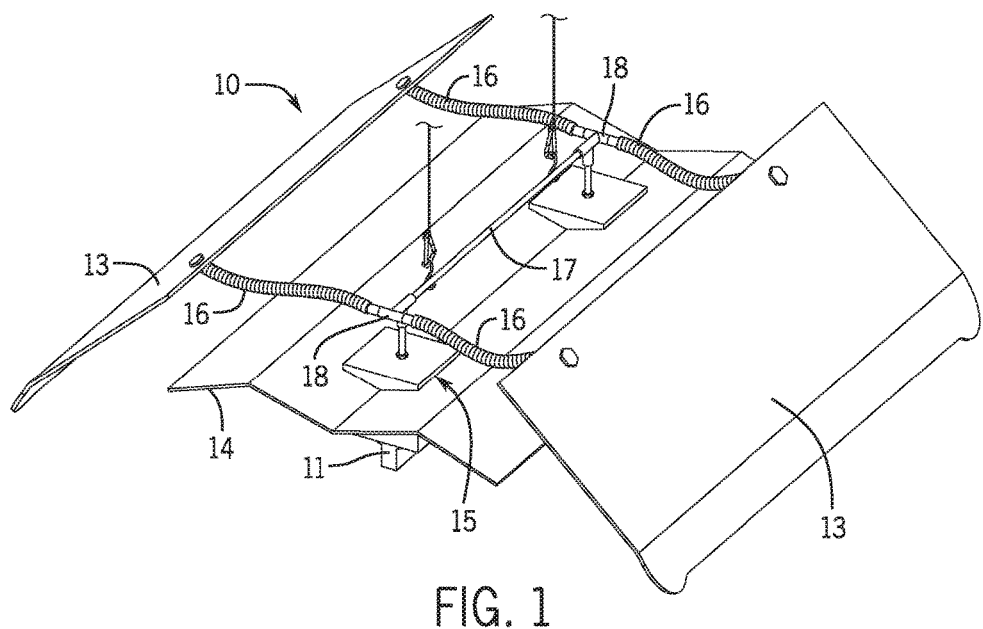
FIG. 1 is a perspective top view of a light enhancing system in accordance with an exemplary embodiment of the subject technology.
Figure 2:
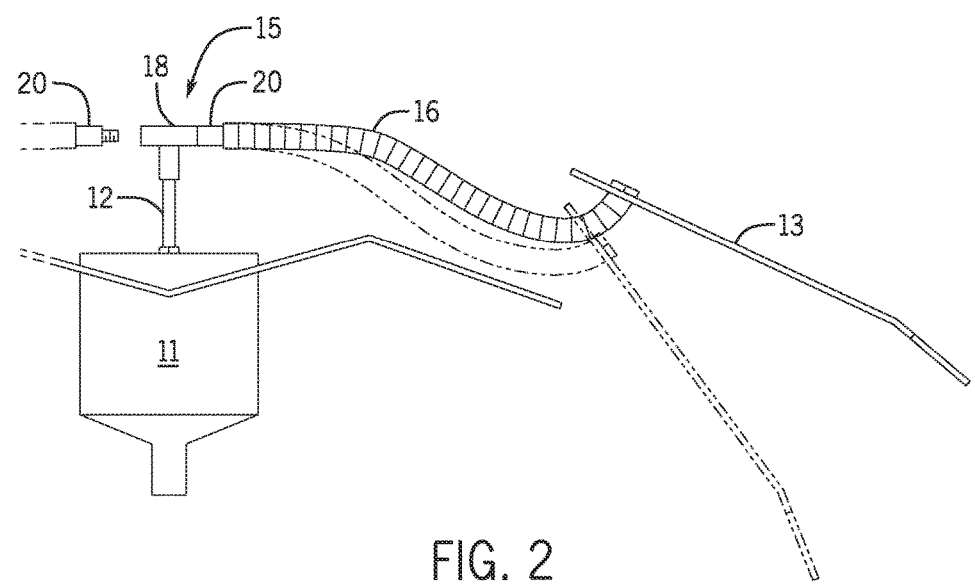
FIG. 2 is an end view of the system of FIG. 1 illustrating adjustable movement of a panel reflector.
Figure 3:
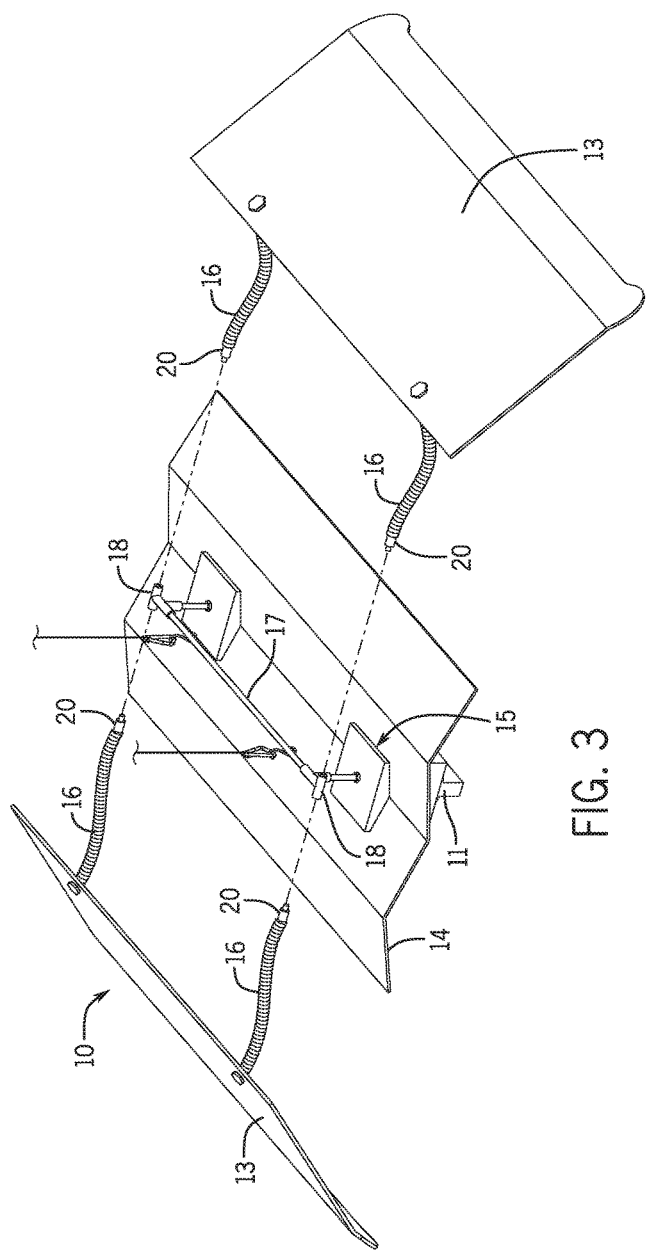
FIG. 3 is an exploded view of the system of FIG. 1.

Referring now to FIGS. 1-3 a light enhancing system 10 (sometimes referred to generally as the "system 10") is shown according to an exemplary embodiment of the subject technology. The system 10 includes a lighting unit 11 with one or more reflector panels 14 disposed to reflect light emitting upward from the lighting unit 11 back down and in the direction of an area being subjected to light. In some embodiments, the reflector panel(s) 14 may extend laterally from a light source and may include a central apex with sections of the reflector(s) 14 projecting toward gravity in an obtuse angle from the apex. In other embodiments, (as previously mentioned), the lighting unit 11 may be for example, a conventional fluorescent lighting box-type fixture.

The system 10 may include a mount fixture 15. In some embodiments the mount fixture 15 is permanently affixed to the lighting unit 11. In some embodiments the mount fixture 15 is retrofit on to the lighting unit 11 housing. The mount fixture 15 may include one or more post(s) 12 extending up from the housing. In some embodiments the mount fixture 15 may include two mounting points and a cross bar 17 connecting the two points across a length of the housing. A 4-way tee coupler 18 may connect the cross bar 17 to the posts 12.

In an exemplary embodiment, the system 10 includes a lamp reflector panel 13, a flexible arm 16 including a first end affixed to the metal lamp reflector panel 13 and a quick-connect fastener 20 on a second end of the flexible arm 16. Some embodiments may include a single reflector panel 13 and one or more flexible arms 16 extending therefrom while other embodiments may include two or even more reflector panels 13 attached to the lighting unit 11. In general, the lamp reflector panel 13 is disposed to extend the area of available light reflection from the lighting unit 11. For example a distal edge of the reflector panel 13 may be positioned beyond a distal end of the reflector panel 14. In some embodiments, the reflector panel 13 may include a flap on the distal edge to further catch and reflect stray lighting from the lighting unit 11. The reflector panel 13 and reflector panel 14 may be metallic, which may include a hammered finish on the underside surface (not shown). The quick-connect fastener 20 may be a threaded or press-fit connector which may be attachable to the tee-coupler 18. The flexible arm 16 may include for example gooseneck tubing. When connected to the mount fixture 15, a user may adjust positioning of the lamp reflector panel 13 by bending the flexible arm 16 so that an angle of reflection of light from the lighting unit 11 off the underside of the lamp reflector panel 13 is adjusted to catch more or less light and reflect more or less light onto an area as desired. As shown in FIG. 2, the flexible arm 16 may be moved to position the underside surface of the reflector panel 13 generally higher and lower and with radial variation from the lighting unit 11.

Figure 6:
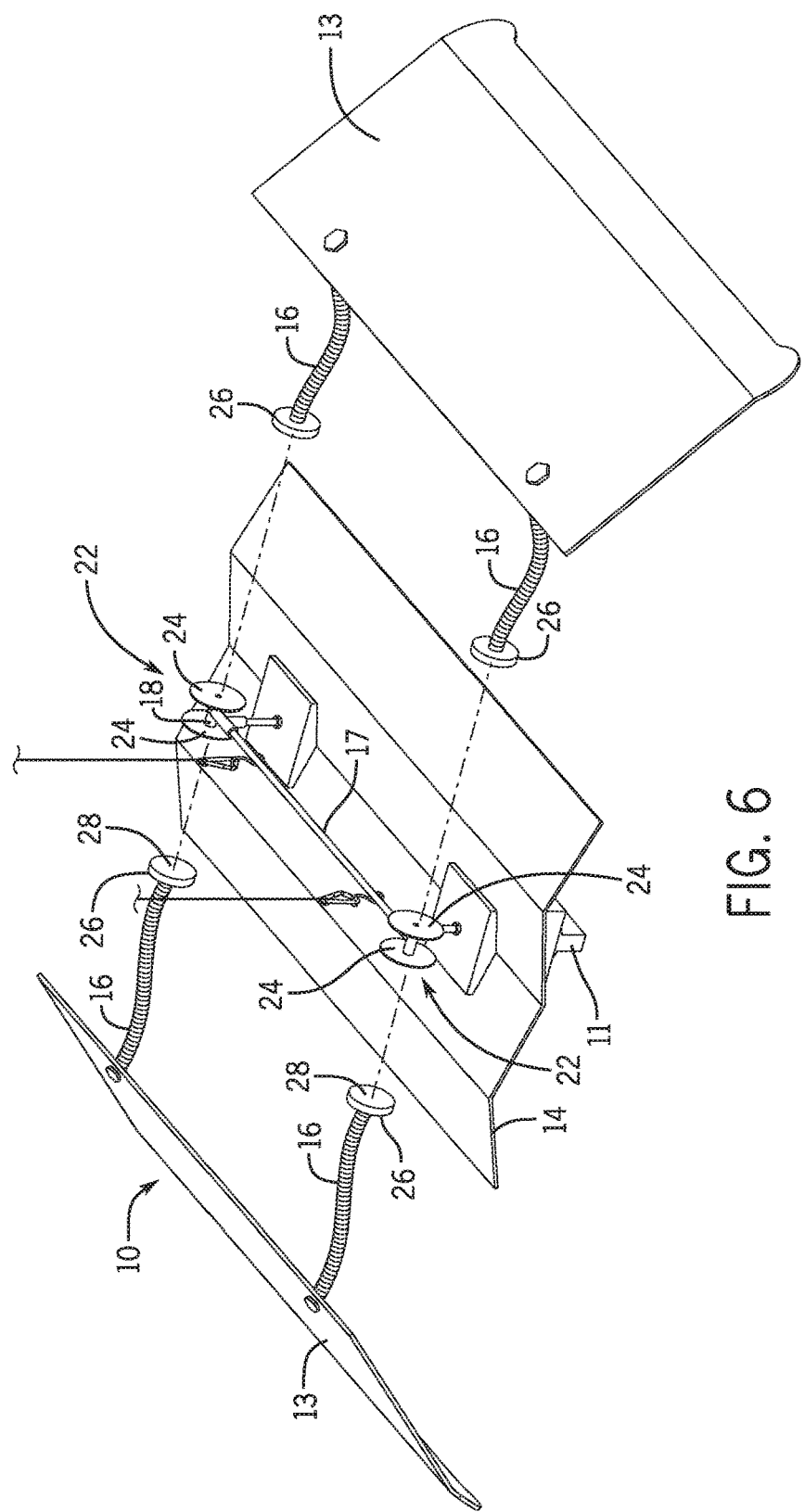
FIG. 6 is an exploded view of the system of FIG. 4.

Referring now to FIGS. 4-6, the system 10 is shown according to an alternate embodiment. The embodiment shown in FIGS. 4-6 is similar to the embodiment shown in FIGS. 1-3 except that the quick-connect fastener 20 includes a magnet 26 and a mount fixture 22 on the lighting unit 11 includes one or more washers 24 configured to receive the magnets 26. In the embodiment shown, each mounting point may include two washers 24 affixed to the tee couplers 18 so that there is one washer 24 for every magnet 26 attaching the reflector panels 13 to the lighting unit 11. As will be appreciated, embodiments using magnets 26 on the ends of flexible arms 16 are readily attachable and detachable not only to the mount fixture 22 as shown but are easily retrofit onto existing off the shelf lighting units with metallic fixture housing.

Figure 7:
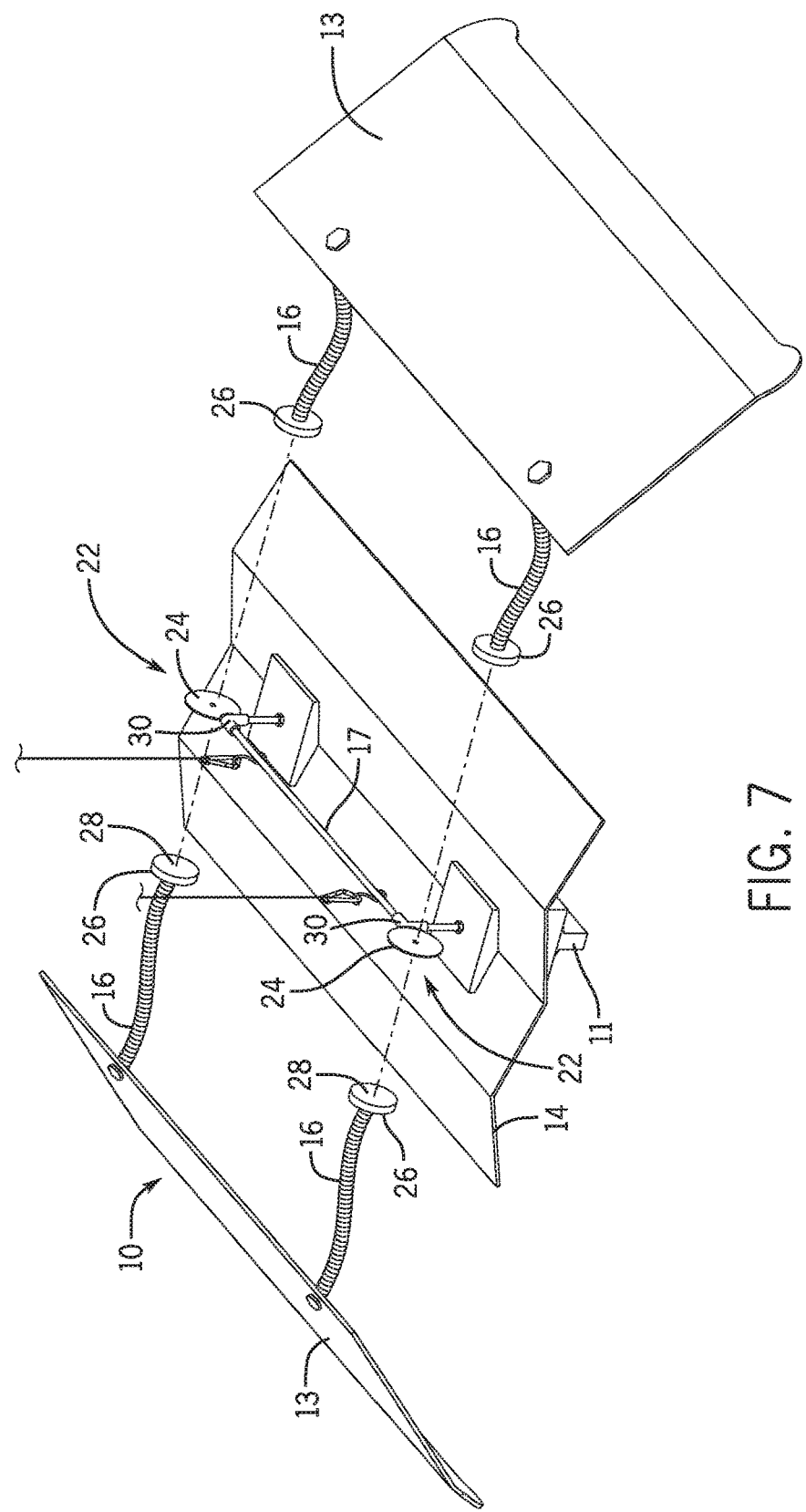
FIG. 7 is a perspective top view of a light enhancing system in accordance with yet another exemplary embodiment of the subject technology.
Figure 8:
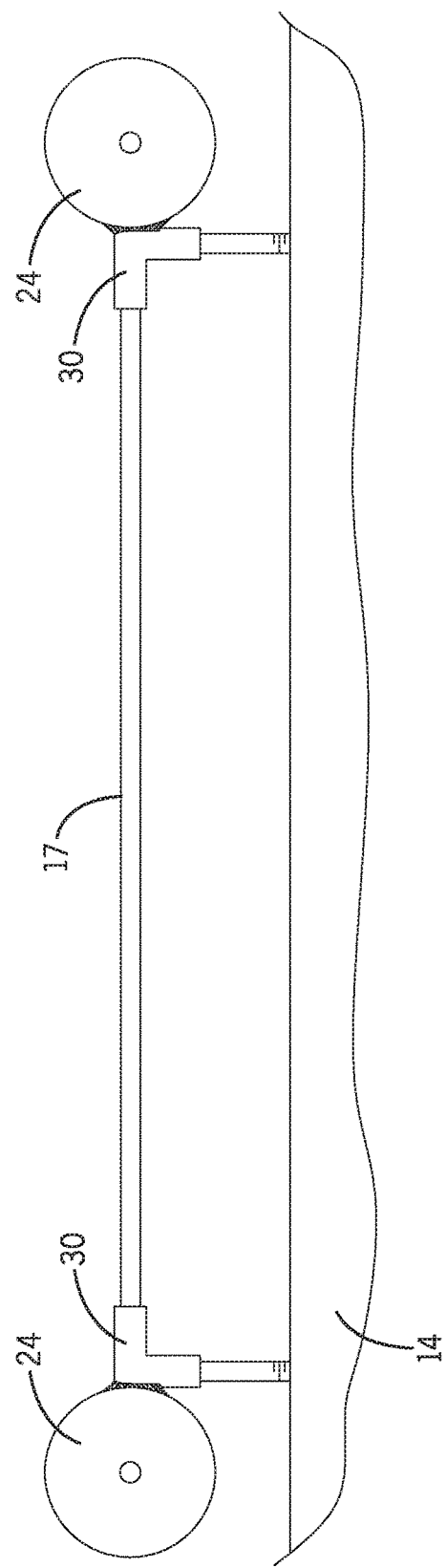
FIG. 8 is a partial side of an alternate mount fixture of FIG. 7 without surrounding elements.

Referring now to FIGS. 7-8, the system 10 is shown according to another alternate embodiment. In FIGS. 7-8, the system 10 is similar to the system 10 shown in FIGS. 4-6 except that the mount fixture includes a single washer 24 tact welded by its edge to an elbow joint 30 on each end of the cross-bar 17. In embodiments with reflector panels 13 on opposing sides of the lighting unit 11, a magnet 26 from opposing flexible arms 16 may each attach onto an opposing side of a common washer 24.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A light enhancing system, comprising:
    a light housing including:
        a light source,
        a first reflector panel extending from the light housing, and
        a mount;
    a second reflector panel;
    a first flexible arm including a distal first end affixed to the second reflector panel, wherein the first flexible arm projects outwardly from an exterior of the light housing and the second reflector panel on the distal end of the flexible arm is also exterior of the light housing;
    a first quick-connect fastener on a proximal second end of the first flexible arm, the first quick-connect fastener attachable and detachable to the mount of the light housing, wherein, when the first quick-connect fastener is attached to the mount, a distal edge of the second reflector panel is positioned beyond and disconnected from a distal end of the first reflector panel, and wherein the first flexible arm is configured to adjust an angle of reflection of light from the light source off an underside of the second reflector panel; and
    a third reflector panel, a second flexible arm affixed to the third reflector panel, and a second quick-connect fastener coupled to the second flexible arm, wherein the third panel reflector is removably attached to the light housing by coupling the second quick-connect fastener to the mount.

2. The system of claim 1, wherein the mount comprises a washer and the first quick-connect fastener is attached to a first side of the washer and the second quick-connect fastener is attached to a second side of the washer.

3. The system of claim 2, wherein the first and second quick-connect fasteners are magnets.

4. The system of claim 1, wherein the first reflector panel is permanently affixed to the light housing.

* * * * *